United States Patent
Frauenhofer et al.

(10) Patent No.: US 12,510,927 B2
(45) Date of Patent: Dec. 30, 2025

(54) METHOD FOR DETERMINING A QUALITY STATUS OF A COMPONENT USED DURING A SETTING PROCESS AND CONTROL DEVICE FOR MONITORING A SETTING PROCESS

(71) Applicant: AUDI AG, Ingolstadt (DE)

(72) Inventors: Michael Frauenhofer, Aichach (DE); Matthias Wimmi, Neuenstadt am Kocher (DE)

(73) Assignee: AUDI AG, Ingolstadt (DE)

( * ) Notice: Subject to any disclaimer, the term of this patent is extended or adjusted under 35 U.S.C. 154(b) by 1034 days.

(21) Appl. No.: 17/567,217

(22) Filed: Jan. 3, 2022

(65) Prior Publication Data
US 2022/0269308 A1    Aug. 25, 2022

(30) Foreign Application Priority Data
Feb. 22, 2021 (DE) .......................... 102021104146.5

(51) Int. Cl.
| | | |
|---|---|---|
| *G06F 1/16* | (2006.01) | |
| *G06F 1/20* | (2006.01) | |
| *G06F 1/3212* | (2019.01) | |

(52) U.S. Cl.
CPC ............ *G06F 1/1635* (2013.01); *G06F 1/206* (2013.01); *G06F 1/3212* (2013.01)

(58) Field of Classification Search
CPC ...... G06F 1/1635; G06F 1/206; G06F 1/3212; Y02E 60/10; B30B 11/005; B60L 58/26; B60L 50/66; H01M 10/613; H01M 10/653; H01M 10/48; H01M 10/625; H01M 10/655
See application file for complete search history.

(56) References Cited

FOREIGN PATENT DOCUMENTS

| | | | | | |
|---|---|---|---|---|---|
| CN | 209085657 | * | 7/2019 | ......... | G05B 23/0297 |
| CN | 209085657 U | * | 7/2019 | ......... | G05B 23/0297 |
| CN | 111354888 A | | 6/2020 | | |
| CN | 112272888 A | * | 1/2021 | .......... | H01M 50/249 |
| DE | 3715077 A1 | | 12/1988 | | |
| DE | 102017223664 A1 | | 6/2019 | | |
| DE | 102018209104 A1 | | 12/2019 | | |
| DE | 102018222459 A1 | | 6/2020 | | |

(Continued)

OTHER PUBLICATIONS

Office Action issued on Feb. 22, 2025, in corresponding Chinese Application No. 202210144896.5, 14 pages.

(Continued)

*Primary Examiner* — Kaity V Chandler
(74) *Attorney, Agent, or Firm* — Maier & Maier, PPLC

(57) ABSTRACT

A method for determining a quality status of at least one component which is used during a setting process, in which a battery module is provided, which is place in a receptacle region of a battery housing having a housing base on a heat conducting compound located on the housing base and is pressed in the direction of the housing base so that the heat conducting compound located between the battery module and the housing base is at least partially distributed. The predefinable force (F) and the distance (z) covered by the battery module during the setting process in the first direction over the time (t) during the setting process are acquired as monitoring variables and the quality status is determined.

20 Claims, 3 Drawing Sheets

(56) References Cited

FOREIGN PATENT DOCUMENTS

DE 102019102003 A1 7/2020
EP 3754744 A1 12/2020

OTHER PUBLICATIONS

German Search Report issued on Aug. 20, 2021 in corresponding German Application No. 102021104146.5; 12 pages; Machine translation attached.

* cited by examiner

METHOD FOR DETERMINING A QUALITY STATUS OF A COMPONENT USED DURING A SETTING PROCESS AND CONTROL DEVICE FOR MONITORING A SETTING PROCESS

FIELD

The invention relates to a method for determining a quality status of at least one component which is used during a setting process in which a battery module is provided, a battery housing having a housing base and a receptacle region assigned to the battery module is provided, wherein a heat conducting compound is arranged in the receptacle region on the housing base and the battery module is placed on the heat conducting compound in the receptacle region and is pressed using a predefinable force in a first direction, which faces in the direction of the housing base, so that the heat conducting compound located between the battery module and the housing base is at least partially distributed in a second direction perpendicular to the first direction. The invention furthermore also relates to a control device for monitoring a setting process and for determining a quality status of a component used during the setting process.

BACKGROUND

A vehicle battery, in particular a high-voltage battery, for an electric vehicle or hybrid vehicle can be constructed as follows: A base plate having integrated cooling channels is fastened to the lower side of a frame manufactured from profiles. Individual battery modules are set in the spaces of the frame, the so-called compartments. In order to enable the heat transfer from the battery modules to the cooling base, a material having good thermal conductivity properties, the so-called gap filler, is introduced between the cooling base and the battery module. The assembly process of the battery provides that the gap filler is applied positioned in each single compartment. In order for the gap filler to thermally connect the largest possible area of the battery modules to the cooling base, the battery modules are pressed with great force into the compartment filled with gap filler. Ideally, the smallest possible gaps are to be achieved between the battery module and the cooling base with the greatest possible degree of wetting of the module surface. This is desirable from both a technical and an economic point of view, since it both increases the vehicle performance and also reduces the material costs. A similar setting process is described, for example, in DE 10 2018 222 459 A1. In this case, however, it can happen that the gap widths that ultimately result between the lower side of such a battery module and the housing base are of different sizes or are excessively large. It can also happen that the heat conducting compound is not ideally distributed and the lower side of the battery module is insufficiently wetted. However, once such a battery module has been inserted into the battery housing, it is no longer possible to check, at least with the naked eye, whether the setting process has actually taken place as desired and whether the battery module is also sufficiently well connected to the cooling base via the heat conducting compound, since the gap between module and housing base is located in a nonvisible region. If, for example, one or more battery modules are not properly connected to the cooling base and this is not noticed during battery production, in the worst case, this can have the result that the battery ultimately overheats when the motor vehicle is in operation, since sufficient heat dissipation cannot be provided.

It would therefore be desirable to be able to assess the quality of a battery provided by such a setting process or, in general, of a component used during such a setting process, in the simplest possible way.

DE 37 15 077 A1 describes a method for controlling a press, using which moldings are pressed from materials in the form of powder or granules. In the course of a pressing stroke, the pressing pressure is measured as a function of the pressing distance and continuously compared to predefined values. The control takes place as a function of the comparison result. The desired curve of the pressing pressure is determined when the molded product produced has the desired properties in a quality test carried out using conventional methods.

In contrast to a battery module, which was inserted into a housing according to the above-described method, such a quality test can be carried out directly on the test subject, since in the described pressing process no individual components are connected to one another, but only a single component, the molding, is produced, the quality of which can, for example, be assessed non-destructively. In addition, such a pressing process is subject to significantly fewer tolerances if only a single component is produced than if multiple components are connected to one another. For example, in order to ensure reproducibility in the setting method for setting the battery module in a housing, for example, the battery modules and also the housing base would always have to have exactly the same geometries, and the heat conducting compound would always have to be provided in exactly the same way in terms of positioning and properties. In reality, however, this is not the case, so that even if the pressing force for pressing the battery module into the battery housing were always chosen to be the same with respect to its curve or would extend within predefinable limits, it nonetheless cannot be ensured that this will ultimately also lead to a desired result.

SUMMARY

The object of the present invention is therefore to provide a method and a control device which enable the quality status of at least one component used during a setting process to be determined in the simplest and most reliable way possible.

In a method according to the invention for determining a quality status of at least one component which is used during a setting process, in which a battery module is provided, a battery housing having a housing base and a receptacle region assigned to the battery module is provided, wherein a heat conducting compound is arranged in the receptacle region on the housing base and the battery module is placed on the heat conducting compound in the receptacle region and is pressed with a predefinable force in a first direction, which points in the direction of the housing base, so that the heat conducting compound located between the battery module and the housing base is at least partially distributed in a second direction perpendicular to the first direction, the predefinable force and the distance covered by the battery module during the setting process in the first direction over the time during the duration of the setting process are acquired as monitoring variables and the quality status is determined as a function of at least one characteristic of at least one of the monitoring variables and a signal is provided as a function of the determined quality status.

The invention is based on the finding that the above-mentioned monitoring variables have characteristics which are ultimately decisive for the quality and from which the quality status may therefore be derived. Because both the predefinable force over time and the distance over time are acquired, this advantageously enables determining one or more characteristics from multiple relationships and their combination, from which properties of the quality status may in turn be derived. This means that not only a force-distance curve can be determined and used to determine the quality status, by comparing randomly determined points on the force-distance curve to one or more limiting values, but also, for example, characteristics of the distance that has been covered over time can be determined or a characteristic can be determined for a force value or value of the distance determined for certain boundary conditions. Nevertheless, is also possible in this way to determine a corresponding force-distance curve, for example, from a provided force-time curve and a distance-time curve. Therefore, the determination of the characteristic of observed force curves which are evaluated can be limited not only to a comparison of such a force curve to upper and lower limits, but preferably at least one characteristic going beyond this or a characteristic different therefrom is determined. By analyzing the determined monitoring variables, it is thus advantageously possible to make a statement about the quality of a component used in such a setting process without having to destroy the component afterwards, for example. Since the evaluation of the quality status is based on measures that are easy to carry out, the quality status of at least one component used during a setting process can be determined in a very simple and reliable manner. By deriving and analyzing at least one such characteristic, it is advantageously possible to obtain an individual statement about the quality status ultimately achieved for each setting process.

It is particularly advantageous if multiple features and curve courses are evaluated in combination, since this enables a particularly accurate statement to be made about the quality status. Therefore, according to a further advantageous embodiment of the invention, it is provided that multiple mutually different characteristics of the acquired monitoring variables and/or their courses are determined and the quality status is determined as a function of the multiple characteristics of the monitoring variables. By deriving and analyzing such multiple characteristics, it is advantageously possible to increase the reliability in determining the quality status.

This quality status can be assigned to the classes "okay" or "not okay", for example. In other words, it is advantageous if the determined quality status indicates whether the component is okay or is not okay. This makes it possible, in a simple manner, to sort out components that are not okay or to initiate other countermeasures or corrective measures. The signal provided as a function of the determined quality status can, for example, correspondingly indicate whether the component is okay or is not okay. Such a signal can be output by a suitable output means, for example displayed on a display or output in the form of a red glowing lamp if the quality status is not okay, and output in the form of a green glowing lamp if the quality status is okay. An acoustic output option for the signal is also conceivable.

The setting process described can be a setting process explained at the beginning, in which, for example, a base plate having integrated cooling channels is fastened to the lower side of a frame manufactured from profiles in order to provide a battery housing in this way. The housing base corresponds accordingly to the cooling base mentioned at the outset. The heat conducting compound can be the gap filler mentioned at the beginning, which generally has a high viscosity and is provided in the form of a very viscous compound or paste. This is applied to the housing base in a corresponding compartment, which represents or at least provides a receptacle region for receiving an assigned battery module, in such a way that the entire base surface in the receptacle region is not wetted by this heat conducting compound. Only the pressing of the battery module onto this heat conducting compound has the result that it is distributed over the surface perpendicularly to the first direction and ideally thus almost completely wets the module base. The predefinable force using which the battery module is pressed in the direction of the housing base can be predefined by a target force curve over the distance or the time. Limits can also be provided for this force curve, which must not be exceeded and/or not met. In other words, when carrying out the described method, it can already be a prerequisite that the force using which the battery module is pressed in the direction of the housing base extends within predefined force limits during the duration of the setting process. Nevertheless, it can still happen that the resulting component arrangement made up of housing base and battery module or, in general, the component used during the setting process does not achieve a desired quality status. This can now advantageously be determined on the basis of the analysis of the at least one characteristic of at least one of the monitoring variables.

It is particularly advantageous if the component represents an arrangement comprising the battery module, the battery housing, and the heat conducting compound, wherein the quality status is determined as a function of a characteristic of a maximum gap height of a gap between the battery module and the housing base that is at least partially filled using the heat conducting compound, and/or is determined as a function of a degree of wetting of the wetting of a lower side of the battery module facing toward the housing base with the heat conducting compound.

In other words, on the basis of the characteristic of the at least one monitoring variable, a statement can be made on the one hand about the maximum gap height of the arrangement and also about the degree of wetting by the heat conducting compound. This is particularly advantageous since these are precisely the two essential variables in order to assess the quality status of this component arrangement made up of battery module, battery housing, and heat conducting compound. Gap widths that are excessively large inhibit the heat transfer from the battery module to the housing base, via which the cooling of the battery modules is typically also provided at the same time, as a result of which sufficient cooling is impaired or not ensured due to gap widths that are excessively large. The same applies to the degree of wetting. If, for example, the gap is sufficiently small, but the heat conducting compound is not sufficiently well distributed in the gap, so that there are many air pockets and gaps between the battery module and the housing base, this also inhibits the heat transfer from the battery module to the housing base, so that sufficient cooling can no longer be ensured. Accordingly, it is advantageous to use precisely these two variables as the main influencing variables for assessing the quality status. These two parameters, namely gap width and degree of wetting, preferably represent the only variables, as a function of which the quality status of the component arrangement is classified as okay or not okay. Corresponding limits, for example, can be predefined both for the gap height and for the degree of wetting. If these are not adhered to, the component arrangement can be classified as not okay with regard to its quality status. The maximum gap height is therefore not to exceed a predetermined limiting value. Likewise, the degree of wetting is not to fall below a predefined limiting value. Whether the relevant limiting values are exceeded or not reached can in turn be determined as a function of the characteristic of the at least one of the monitoring variables.

However, it is particularly advantageous that by evaluating a force and/or distance characteristic, it is not only possible to obtain a statement about the quality status of the component arrangement, but also, for example, a statement about the quality status of the facility by means of which the setting process is carried out. Accordingly, it represents a particularly advantageous embodiment of the invention when the component or a second component, the quality status of which is determined, represents at least part of the setting device and the quality status represents a state of wear of the at least one part of the setting device. This in turn is based on the finding that, for example, by evaluating the force-time curve or force-distance curve, a statement can also be concluded about how much mechanical play the robot setting arm or the gantry or the gantry robot has, which exerts the pressing force on the battery module. Such a play can be determined, for example, via the effect of the force exerted on the module in the direction of the housing base as a function of the distance covered by the module in the direction of the housing base. A large amount of play indicates a high level of wear on the system or the setting device. This in turn makes it possible to service the setting device deliberately before a defect in order to minimize downtimes caused by a defect.

In one particularly advantageous embodiment of the invention, the at least one characteristic is acquired as a characteristic of a curve of the force over time, in particular a slope of the curve and/or a curve of the distance over time and/or a curve of the force as a function of the distance and/or a curve of the distance as a function of the force, in particular in the form of a path length from a predetermined force threshold value of the force. This means that overall there are numerous options available for determining curve characteristics that indicate a quality status of the component. Especially with regard to the component arrangement made up of battery module, battery housing, and heat conducting compound, reliable statements about the quality status can be made by way of the mentioned curves and their characteristics. It has been found that especially the following characteristics are correlated with the quality status of this component arrangement: On the one hand, the quality status is correlated with the slope of the force curve over time, namely the force curve from the point in time at which the force decreases over time. As a result, the slope of this force curve is negative. The force curve during the setting process is generally as follows: The battery module is initially pressed with increasing pressing force in the direction of the housing base, wherein during this first setting section, the pressing force increases strongly over time, in particular up to a maximum, and subsequently decreases again. The battery module is pressed further in the direction of the housing base, but with increasingly reduced pressing force. When a certain period of time has elapsed, the pressing of the battery module is ended and the setting device moves back, that is, it reduces the pressing force to zero while the battery module remains in the battery housing. In addition to the above-mentioned slope of the force in the decreasing force section, however, other characteristics of the force and/or distance curve can also be evaluated, which are related to the ultimate quality of this component arrangement. Furthermore, it has been shown that the position of the force-distance corner points is also correlated with the quality status of this battery arrangement. Accordingly, it is advantageous to determine the position of these force-distance corner points and to use it for evaluating or determining the quality status. Such a force-distance corner point describes, for example, the force, that is to say the pressing force, that is exerted on the battery module by the setting device immediately before the setting process is ended, that is, after the predefined period of time has elapsed. As described, the force during the setting process is reduced again from a certain reversal point after a maximum force has been reached. This reduction is controlled in such a way that it extends linearly with the distance that the battery module covers in the direction of the housing base. In other words, the force decreases linearly with increasing distance of the battery module in the direction of the housing base. After the predefined period of time has elapsed, this pressing process is ended, which means that the battery module has covered a corresponding final path length, and at the time the pressing has ended, a final force has acted on the battery module. These two parameters, final force and final distance, are also correlated with the quality status. Accordingly, it is particularly advantageous to also determine this final force and this final path for a respective battery module in the scope of the setting process and to take them into consideration when determining the quality status.

In the simplest case, the quality status can be determined as a function of the above-mentioned monitoring variables and their characteristics in such a way that corresponding limiting values are applied to the described characteristics. If, for example, the slope defined above moves within predetermined maximum and minimum limits, the component arrangement can ultimately be assessed as okay with regard to its quality status. The same also applies to the position of the corner points, that is, the final distance and/or the final force.

Although the quality status cannot always be correctly determined in this way, an enormous improvement with respect to the prior art can at least be achieved in this way. An additional improvement can above all be provided by an analysis of the mentioned curves and courses using big data methods, for example to also determine further patterns and relationships.

It represents a further advantageous embodiment of the invention when the quality status is determined by an artificial intelligence, in particular by an artificial neural network. Such an artificial neural network can be trained very simply as follows: First, a setting process, as has already been described, can be carried out and the monitoring variables mentioned can be acquired and accordingly supplied to the neural network as input variables. These input variables thus describe, for example, the force curve over time, the distance curve over time, and/or the force curve as a function of the distance and/or the distance curve as a function of the force. Characteristics, such as the above-mentioned characteristic corner points, that is to say, final force and/or final distance, as well as the slope described, can also be determined in advance and supplied as input parameters to the neural network. The quality status of the component arrangement provided can then be determined as follows: After the gap filler or the heat conducting compound has dried out, the component arrangement can be dismantled again, that is to say, it can be disassembled into its individual parts. This is accompanied by destruction of the component arrangement. The components, which have now been disassembled again, can be used to measure how high the degree of wetting and the maximum gap height were. These can accordingly be supplied to the neural network as a result. In other words, this maximum gap height obtained in this way represents a degree of wetting of the output data set matching with the input data. These procedures can be performed similarly using numerous setting processes that are carried out in order to train the neural network. On the basis of the input parameters that are ultimately provided to the neural network after the training phase, as part of a newly carried out setting process, this can then output the maximum gap height and the degree of wetting as output data. On the basis of these output variables which are output, the quality status can in turn be determined by applying an upper or lower limiting value, respectively, to the corresponding variables, as already described above. If the maximum gap height exceeds a predefined value or if the degree of wetting falls below a predefined value, the component arrangement is deemed not to be in okay and in all other cases to be okay.

Another great advantage of the invention is moreover that, based on the force and/or distance curves mentioned, conclusions can also be drawn about other parameters of the setting process. In addition to the state of wear of the setting device, these are also, for example, the viscosity and open time of the heat conducting compound. As described, the heat conducting compound is first applied to the housing base and then the battery module is placed thereon. As a rule, the heat conducting compound consists of multiple components that are mixed with one another during application and cure over time after the application. But even in the case of a single-component heat conducting compound, it cures over time after it has been applied to the housing base. Accompanying this, the viscosity of the heat conducting compound also changes. If the placement of the battery module occurs with a strong time delay from the application of the heat conducting compound, this compound then has, for example, a significantly higher viscosity than if the battery module were placed thereon immediately after the application of the heat conducting compound. Accordingly, differences also result in the way in which this heat conducting compound can be pressed between the battery module and the housing base. In this way, for example, the time of application at which the heat conducting compound is applied to the housing base and the start of the pressing process can also be used as further input parameters for determining the quality status. Vice versa, such viscosity properties of this type can also be derived from the above-described characteristics, for example the mentioned slope of the force-time curve. The viscosity of the heat conducting compound can, however, not only be influenced by its open time, which is defined by the time span between application and placement explained above, but also, for example, by the ambient temperature or the hall temperature of the hall in which manufacturing takes place. Summer-winter differences can be particularly noticeable here, as can differences due to the time of day.

Accordingly, it represents a further, very advantageous embodiment of the invention if at least one status parameter different from the monitoring variables is acquired and the quality status is determined as a function of the status parameter. In other words, environmental conditions can also influence the quality of the component or the component arrangement that is ultimately manufactured. Such status parameters can thus advantageously also be taken into consideration. These can, for example, also be supplied to the neural network or other big data methods as further input parameters. This allows the quality status to be determined even more accurately.

Vice versa, however, it can also be provided that a state parameter is determined as a function of an analysis of the monitoring variables and/or as a function of the at least one characteristic, for example a viscosity of the heat conducting compound at the time of pressing. This is because in the case that the quality status is determined to be not okay, this advantageously also enables the reason for this quality status to be determined, for example, an excessively high viscosity due to excessively long open time of the heat conducting compound. This in turn makes it possible to take deliberate countermeasures for subsequent setting processes in order to avoid further excessively poor quality results.

As described, it is particularly advantageous if the state parameter represents a temperature in the surroundings of the heat conducting compound and/or the state parameter represents a period of time between applying the heat conducting compound to the housing base and placing the battery module. Both of these influence the viscosity of the heat conducting compound, which in turn influences the result of the setting process. This allows the quality status to be determined even more precisely, that is to say more frequently and accurately determined.

In addition, the finding that, for example, a statement about the viscosity of the heat conducting compound can also be derived from the mentioned monitoring variables or their curves can also be used, for example, to find an explanation for why a process was assessed as not okay, for example. Another problem with previously used methods, which only output an okay or not okay signal at the end of a process, for example, is moreover that no further information is given as to why, for example, a process was assessed as not okay or what represents the possible cause for a poor quality result. This is because the quality features that are typically evaluated do not allow any direct conclusion to be drawn about faulty process variables that would have to be adjusted, for example. The error search in the event of a not okay result is very complex due to the number of the influencing variables and the complexity of the process. By evaluating the characteristics described, however, a possible cause of the error can also be uncovered, which can, for example, be due to excessively long standing times of the heat conducting compound or excessively high or low temperatures. Such state variables that negatively influence the setting process can then be adjusted accordingly or they can be counteracted in some other way. For example, care can be taken to ensure that standing times are not excessively long and/or that appropriate air conditioning is carried out for temperature control. Vice versa, longer standing times can also be permissible at higher temperatures than, for example, at lower temperatures or vice versa, depending on how these parameters affect the viscosity of the heat conducting compound. Opposing influences can be utilized or taken into consideration here. The state of wear of the facility can also have a negative effect on the quality status of the component. Correspondingly, the state of wear of the facility can also be taken into consideration in the evaluation as a possible cause of a poor quality status. As a result, process parameters can advantageously be adjusted in order to achieve better results, for example.

In a further advantageous embodiment of the invention, it is provided that frequencies of the curve of the force and/or a characteristic of work performed by the force over time are determined as the at least one characteristic. Such an evaluation primarily allows conclusions to be drawn about the state of wear of the setting device. Such an evaluation can in turn be carried out using suitable limiting value methods or big data methods, artificial intelligence, or the like. For example, force excitation curves of a low-wear, already maintained, or new facility can be compared to those of the setting device. Excessive deviations or noticeable deviations, for example in certain frequency ranges, or the occurrence of certain unusual frequencies, can be an indication of increased wear. This in turn enables timely maintenance of the setting device.

Furthermore, the invention also relates to a control device for monitoring a setting process and for determining a quality status of at least one component which is used during the setting process in which a battery module is provided, a battery housing having a housing base and a receptacle region assigned to the battery module is provided, wherein a heat conducting compound is arranged in the receptacle region on the housing base and the battery module is placed on the heat conducting compound in the receptacle region and is pressed using a predefinable force in a first direction, which faces in the direction of the housing base, so that the heat conducting compound located between the battery module and the housing base is at least partially distributed in a second direction perpendicular to the first direction. In this case, the control device is designed, for monitoring the setting process, to acquire the predefinable force and the distance covered by the battery module during the setting process in the first direction over time during the period of the setting process as monitoring variables and to determine the quality status as a function of at least one characteristic of at least one of the monitoring variables and to provide a signal as a function of the determined quality status.

The advantages described for the method according to the invention and its embodiments apply in the same way to the control device according to the invention.

The control device can have a data processing device or a processor device which is configured to carry out an embodiment of the method according to the invention. For this purpose, the processor device can have at least one microprocessor and/or at least one microcontroller and/or at least one FPGA (Field Programmable Gate Array) and/or at least one DSP (Digital Signal Processor). Furthermore, the processor device can have program code which is configured to carry out the embodiment of the method according to the invention when it is executed by the processor device. The program code can be stored in a data memory of the processor device.

The invention also includes refinements of the control device according to the invention, which have features as have already been described in conjunction with the refinements of the method according to the invention. For this reason, the corresponding refinements of the control device according to the invention are not described again here.

The invention also comprises combinations of the features of the described embodiments. The invention therefore also comprises implementations which each have a combination of the features of several of the described embodiments, unless the embodiments have been described as mutually exclusive.

BRIEF DESCRIPTION OF THE FIGURES

Exemplary embodiments of the invention are described hereinafter. In the figures.

DETAILED DESCRIPTION

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is intended to comprise combinations of the features of the embodiments other than those shown. Furthermore, the described embodiments can also be supplemented by further ones of the above-described features of the invention.

In the figures, the same reference signs designate elements that have the same function.

Figure 1:
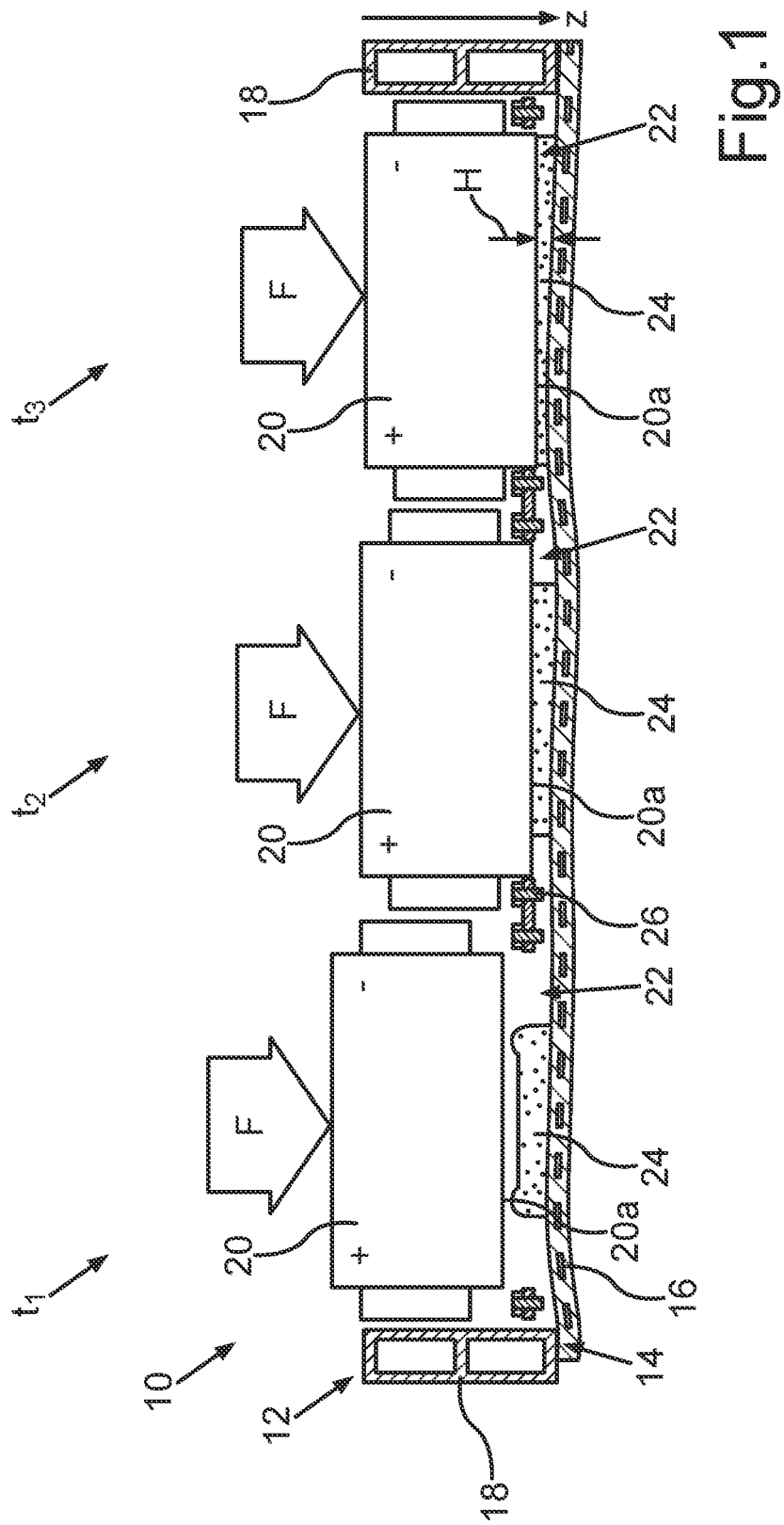
FIG. 1 shows a schematic cross-sectional illustration of a battery arrangement having a battery housing and battery modules during a setting process according to one exemplary embodiment of the invention.

FIG. 1 shows a schematic cross-sectional illustration of a battery arrangement 10 during a setting process according to one exemplary embodiment of the invention. The battery arrangement comprises a battery housing 12. In this example, this is in turn made in several parts. On the one hand, the battery housing 12 has a housing base 14. This is designed as a cooling base and in this example comprises multiple cooling channels 16 through which a coolant can flow, of which only one is provided with a reference number for reasons of clarity. Furthermore, the battery housing 12 also comprises a frame 18, on which the housing base 14 is arranged on the lower side. This frame 18 is manufactured from profiles in this example. The housing base 14 is also provided as a base plate having integrated cooling channels 16. Furthermore, the battery housing 12 can also be permeated with separating webs which are optionally designed as profiles, but which are not shown in this example. Furthermore, the arrangement 10 has multiple battery modules 20, wherein three battery modules 20 are shown in this example. A respective battery module 20 is inserted into a receptacle region 22 corresponding to the battery module 20, specifically in a setting direction z, which in this example points from top to bottom and is directed from the respective battery modules 20 in the direction of the housing base 14. Before a respective battery module 20 is inserted, however, a heat conducting compound 24 is first applied to the housing base 14 in a respective receptacle region 22. The battery module 20 is then inserted into the corresponding receptacle region 22 and pressed with a pressing force F in the first direction z in the direction of the housing base 14, so that the heat conducting compound 24 located between the battery module 20 and the housing base 14 is distributed, in particular in directions perpendicular to first direction z. After the setting process, the respective battery modules 20 can be connected to the housing 12 via corresponding connections 26, in this example screw connections 26, and thus fastened thereon. Here, tolerance compensation elements can also be used, which enable a tolerance compensation in the z direction. The heat conducting compound 24 then cures.

The heat conducting compound 24 enables heat to be dissipated from the battery module 20 to the cooling base 14. To optimize this heat dissipation, it is advantageous if the heat conducting compound 24 is pressed during this described selling process so that as much as possible the entire lower side 20a of the battery module is wetted using the heat conducting compound 24 and moreover a height H of the gap provided in the final state of the arrangement 10 between the lower side 20a of the relevant battery module 20 and the housing base 14 is as small as possible. A low degree of wetting as well as air pockets and high gap heights reduce the efficiency of the heat dissipation. The quality status of the resulting arrangement 10 can thus be measured on the basis of this gap height H and the degree of wetting. Quality statuses can also be determined for respective arrangement regions of the arrangement 10, wherein a respective arrangement region is assigned to a battery module 20 and comprises, for example, the relevant battery module 20, the housing base section of the housing base 14 in the receptacle region 22 assigned to the battery module 20, and the heat conducting compound 24 arranged on this housing base section.

In addition, FIG. 1 shows the three modules 20 at different points in time t1, t2, t3 in the course of the setting process. Here, t1 represents the earliest point in time, t2 represents a later point in time, and t3 represents the final point in time at the end of the setting process. At the point in time t1, the battery module 20 is just being inserted into the associated receptacle region 22 and does not yet touch the heat conducting compound 24. At the point in time t2, the battery module 20 is already in contact with the heat conducting compound 24 and has already pressed it to a certain extent perpendicular to the z direction. Correspondingly, t3 shows the final state in which the gap height H is minimal and the heat conducting compound 24 is pressed maximally perpendicular to the z direction.

In order to be able to assess whether a battery system provided in this way meets the requirements for heat dissipation, that is to say, whether it is okay or not with respect to maximum permissible gap height H and the minimal permissible degree of wetting, may no longer be so easily assessed, however, in the installed or set state. In particular, the gap height H and the degree of wetting do not represent variables that could be directly metrologically acquired in the final state of the battery arrangement 10. Up to this point, it was only possible to establish whether a setting process is actually okay or is not okay by destructive tests on assembled batteries with respect to their quality. The degree of wetting and gap height are evaluated here and process parameters are adjusted if necessary. Furthermore, it is possible to predict the quality status, that is to say whether the setting process result is okay or not, based on the fact that the travel of a force-distance curve lies within a certain window. If, for example, a certain permissible maximum force is exceeded or a predefined minimum force is not reached, the quality status can be predicted to be not okay. Whether this is actually the case can only be checked by means of the destructive test described above. This approach has significant disadvantages. For example, a not-okay signal does not provide any information about why a process is not okay. The evaluated quality features also do not provide any direct conclusion about the faulty process variable that has to be adjusted. The error search in the event of a not okay result is very complex due to the number of the influencing variables and the complexity of the process. The results of the check are only available several days after the battery has been constructed, as the gap filler first has to cure before installation before an evaluation can start.

By way of the invention and its embodiments, it is now advantageously possible to determine the quality status of a component used during such a setting process, in particular the arrangement 10 made up of at least one battery module 20, the housing 12, and the gap filler 24 arranged between the housing base 14 and the battery module 20, without having to destroy this arrangement 10 at the same time. For this purpose, the force F in the curve of time t (cf. FIG. 2) and also the distance z covered by module 20 during the setting process in the first direction over time t are acquired as monitoring variables and these monitoring variables are evaluated. In particular, further characteristics can be derived from these monitoring variables and their curves as well as characteristic points, which are correlated both with the gap height H and with the degree of wetting and thus ultimately with the quality status. This will now be explained in more detail below.

Figure 2:
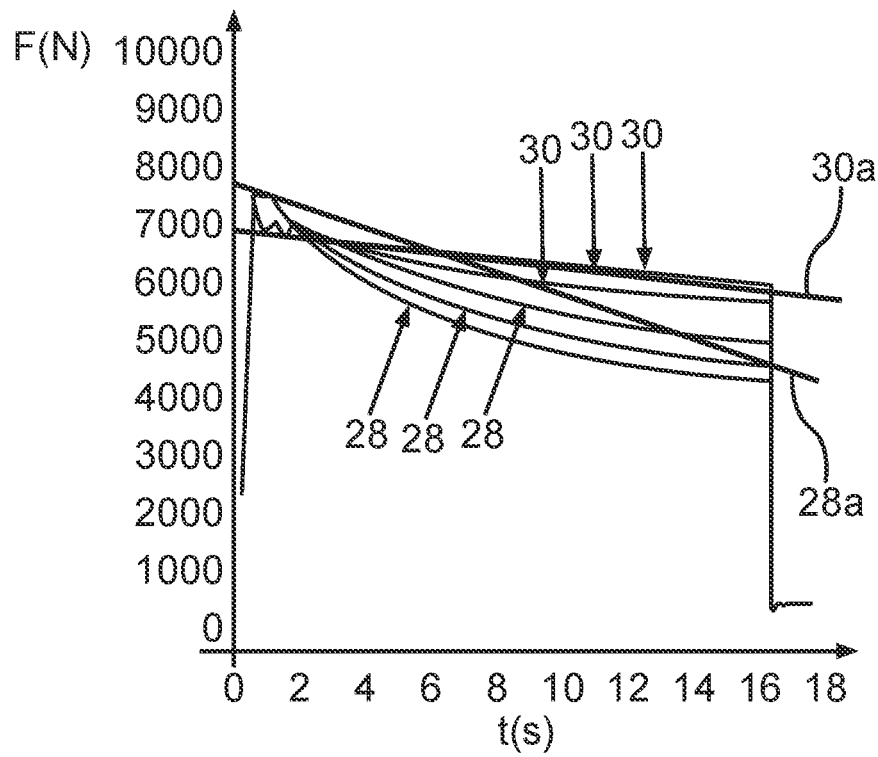
FIG. 2 shows a schematic illustration of the curve of the force acting on a battery module during the setting process.

FIG. 2 shows a schematic illustration of the curve of the force F over time t during a setting process for six different module arrangements, which can be divided into two different test groups 28, 30 here. The pressing process or setting process is ended after a predetermined time has elapsed, in this example approximately 17 seconds. At the beginning, the force F exerted on the modules 20 is increased very quickly to its maximum value within a very short period of time, approximately one second. After a subsequent transition phase, the force F begins to decrease continuously in the course of time t. In FIG. 2, the slopes 28a, 30a for this decreasing force section of the respective test groups 28, 30 are also shown schematically. It has been shown that the final quality state and in particular ultimately the gap height H and the degree of wetting are correlated with this slope 28a, 30a. A less steep slope, such as the slope 30a of the first test group 30 in this example, has proven to be more advantageous and provided a better result. Correspondingly, such a slope 28a, 30a of the force profile over time t represents a characteristic which can be used to determine the quality status. In the simplest case, such a determined slope can be compared to a limiting value or also two limiting values, an upper and a lower one, and if one of these limiting values is exceeded or not reached, the quality status can be classified as not okay and otherwise as okay. However, it is particularly advantageous to use a big data method, for example an artificial intelligence, for example an artificial neural network, to determine the quality status. This can be trained using the curves mentioned and curves described below, as well as the corresponding characteristics, corner points, and other properties that can be derived from these curves as input data. As assigned output data, the corresponding module arrangements 10 can be checked by destruction with regard to their respective gap height H and the degree of wetting and the correspondingly determined values can be used as training data. Ultimately, this makes it possible, on the basis of the input data described and the characteristics described below as input data, to determine very frequently applicable statements about the ultimate quality status of such an arrangement 10.

Figure 3:
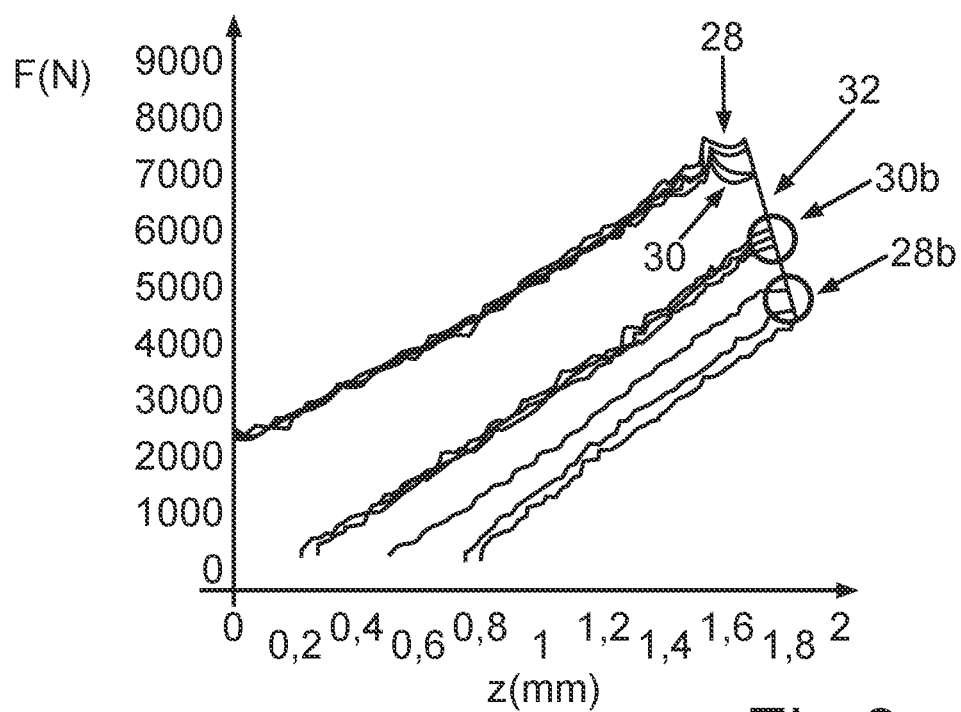
FIG. 3 shows a schematic illustration of the course of the force as a function of the distance of the battery module during the setting process.
Figure 4:
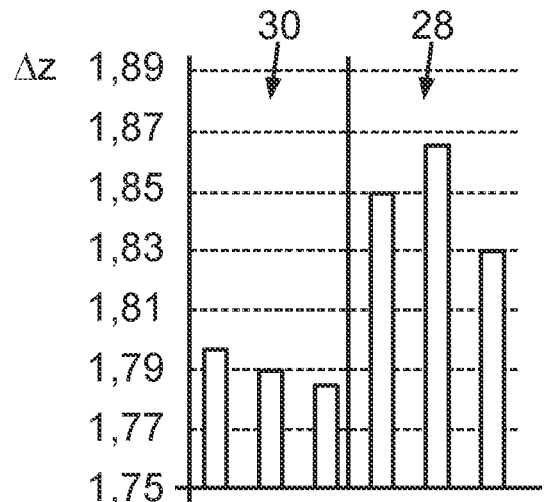
FIG. 4 shows a schematic illustration of the distances covered by the respective battery module during a setting process.

FIG. 3 shows a further illustration of the force F for the two test groups 28, 30, now as a function of the distance z covered in millimeters. As can be seen here, the force increases again at the beginning of the setting process with the increasing distance z covered. At the point in time at which the force F begins to decrease continuously, as was described for FIG. 2, the force F decreases linearly as a function of the distance z. This linear region is designated by 32 in FIG. 3. The force F decreases until the setting process has ended. This is the case when the predefined period of time has passed, which, as already mentioned, is approximately 16 to 17 seconds in the present example. These end points are designated by 29b and 30b in FIG. 3 and correspond to the associated test groups 28, 30. At these end points, which define the final force on the one hand and the final distance on the other, the setting device reverses the path. It moves back to its starting position while the module 20 remains in the receptacle region 22. The retraction is accordingly accompanied with a decreasing distance z and with a reduction of the pressing force F to zero. From this linear section 32 as well as the corresponding end regions 28b, 30b, statements can also again be made about the ultimate quality status. Correspondingly, precisely these points 28b, 30b represent suitable input variables for determining the quality status. As can also be seen from FIG. 3 and as is illustrated again more clearly in FIG. 4, the battery modules 20 of the first test group 28 have covered a significantly longer distance Δz in this linear region 32 than those of the second test group 30. FIG. 4 shows the respective distances Δz covered by the modules 20, once for the first test group 28 and once for the second test group 30. The distance Δz covered relates to a defined starting time of the setting process and/or from a starting time from which a specified force threshold value, for example 3000 Newtons, is exceeded. The invention is also based on the finding here that precisely this distance Δz still covered from this force threshold value of the force F is correlated with the resulting quality status. Correspondingly, a minimum limiting value and a maximum limiting value can also be provided here, within which this distance Δz has to lie so that the resulting arrangement is classified as okay with regard to its quality status. Here, too, it is again conceivable to feed this distance Δz to a learning method as an input parameter in order to determine the quality status. Ultimately, it is particularly advantageous if the quality status is determined as a function of a distance change of the distance covered by a respective battery module 20, which begins when the force F acting on the module 20 exceeds a predetermined force limiting value and ends with the end of the setting process.

On the basis of this distance Δz, however, not only the quality status of the arrangement 10 after the setting process can be determined, but further conclusions can also be drawn. Overall, the above-mentioned characteristics and curves can also be used to determine, for example, the viscosity of the heat conducting compound 24, the open time or standing life of the gap filler batch, i.e., the duration between the application of the heat conducting compound 24 on the housing base 14 and the placement of the modules 20. Conversely, it is also advantageous not only to acquire the monitoring variables described, but also to use further items of information in combination with this force and/or distance curve of the pressing process, for example hall temperature, application time, and start of the pressing process. In addition, the tolerance position of the battery tray and/or the flatness of the individual compartments can also be determined on the basis of the characteristics. The geometry of the battery housing 12 is preferably initially measured, so that the flatness of the individual compartments is preferably also known initially. If this measurement option fails for any reason, then there is advantageously also the option of determining the extent of the unevenness of the housing base 14 via the curves mentioned. Finally, it is advantageously also possible to determine the system state including wear from the curves described. These are particularly great advantages because, for example, this enables timely maintenance of the system, that is to say the setting device that automatically executes the setting and pressing on of the battery modules 20, in particular before a defect in the system occurs and/or the system wear also becomes negatively noticeable in the quality status of the module arrangement.

Figure 5:
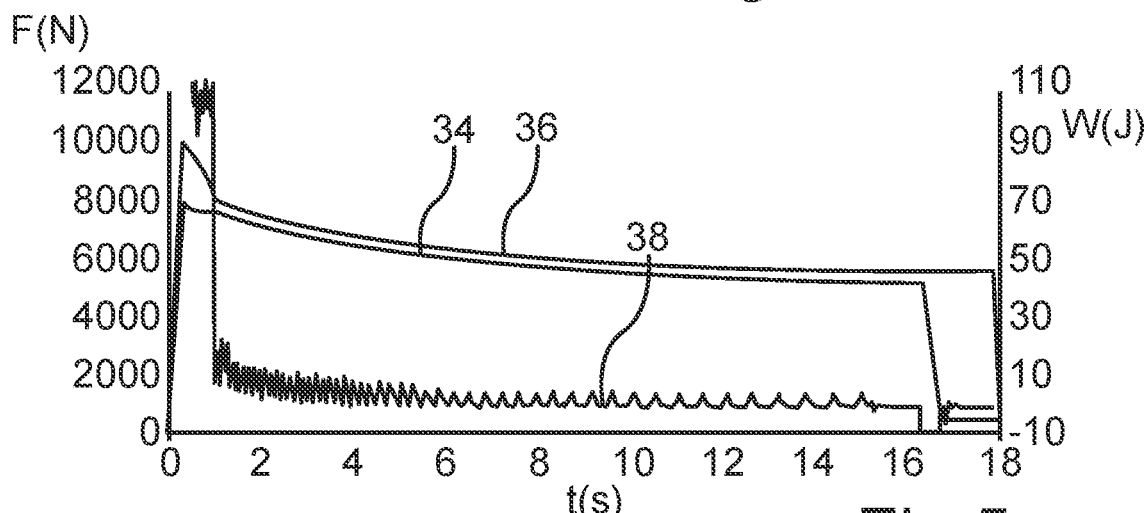
FIG. 5 shows a schematic illustration of the curve of a predefined target excitation force of the actual excitation force and the work performed by the setting device for setting the battery modules during the setting process.

For this purpose, FIG. 5 shows, for example, a schematic representation of a force S also exerted in the battery module 20 during a setting process, which is illustrated by the curve 34, the associated, predetermined target curve 36, and the work W performed by the system during the setting process, which is also shown as a corresponding curve 38. The work W results from the product of the force M and the distance z covered by the module 20. As can be seen, a certain waviness of the curve 38 of the work W results. This curve 38 also contains items of information about the system wear. An evaluation of this work W or its corresponding time curve 38 can thus advantageously also be used to determine a quality status of the system, that is to say of the setting device. For this purpose, in particular the frequencies present in this curve 38 can be evaluated, for example by means of a Fourier analysis of this curve 38. These can be compared, for example, to a target frequency spectrum or a target curve for the work curve 38. An artificial neural network or other big data processes can also again be used here to determine the system wear as a further example of a quality status.

Figure 6:
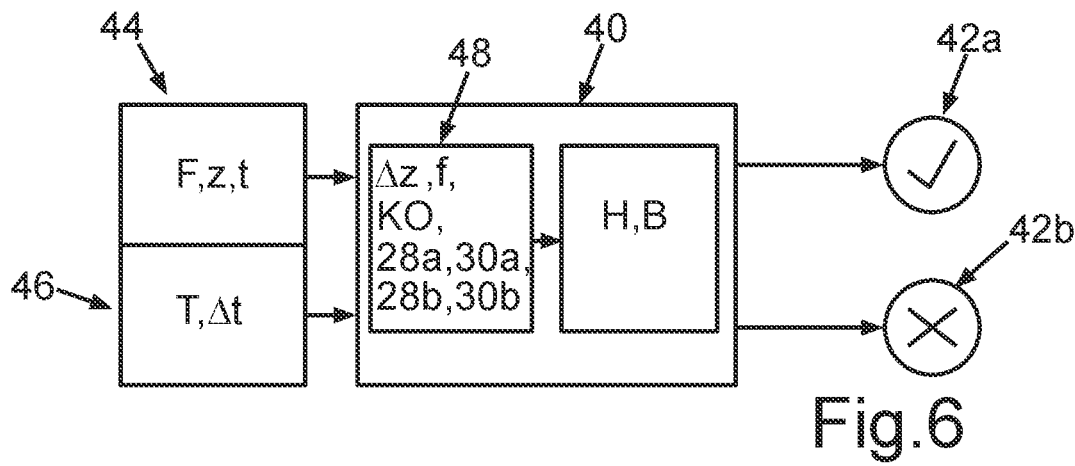
FIG. 6 shows a schematic illustration of a control device for determining a quality status of a component used during a setting process according to one exemplary embodiment of the invention.

FIG. 6 shows a schematic illustration of a control device 40 for determining a quality status 42a, 42b of a component, for example of the arrangement 10 from FIG. 1, according to one exemplary embodiment of the invention. The control device 40 is designed to acquire monitoring variables 44, such as the force F, the path z, and the time t in this example, during a setting process as described above.

In addition, items of information that are additionally available, which are referred to below as status parameters 46, are also acquired in this example. In the present example, these represent a temperature T in the immediate surroundings of the setting arrangement 10, for example within the building or the manufacturing hall in which the setting process is carried out, as well as the open time Δt of the heat conducting compound 24. These acquired variables and parameters 44, 46 are supplied to the control device 40 as input parameters. This control device can determine further variables, in particular characteristics 48, from these supplied data. In this example, the characteristics represent the path length Δz described for FIG. 4, the frequencies f contained in the temporal work curve 38, as explained for FIG. 5, the slopes 28a, 30a of the force curves, as described for FIG. 2, the end points 28b, 30b and, for example, the associated final forces KO, as was explained in relation to FIG. 3, as well as optional further characteristics. From these curves and characteristics, conclusions can advantageously be drawn about the final height H between the battery module 20 and the housing base 14, as well as the degree of wetting B of the wetting of the lower side 20a of the respective battery modules 20 by the heat conducting compound 24. Thus, the gap height H and/or the degree of wetting B are determined at least approximately as a function of these characteristics 48. The resulting variables, that is to say the gap height H and the degree of wetting B, can then be compared to predefined limiting values, and depending on a result of the comparison, the module-housing arrangement in question can be classified as okay 42a or not okay 42b.

The evaluation of the individual influencing variables can therefore advantageously take place through automated evaluations of the pressing process based on force, distance, and time. A wide variety of parameters can be monitored, for example material parameters, the open time, the system status or the state of wear of the system, flatness of battery module and battery tray, and so on. An analysis of the curves by big data methods is also conceivable in order to determine further patterns and relationships.

Overall, the examples show how the invention can provide a setting process for battery modules for which quality monitoring is provided by evaluating the process data of the gap filler pressing. Various conclusions can be drawn about the viscosity and the open time of the gap filler batch, the tolerance position of the battery tray, the evenness of the individual compartments, and the system status including wear from force and distance curves of the pressing process, in particular in combination with further items of information, for example the hall temperature, application time, and start of the pressing process. This results in the great advantages that, in the case of a process that assessed as not okay, the process parameters can be checked and corrected in a targeted manner before the battery is dismantled and evaluated, and thus a significantly higher reaction speed can be achieved. Process parameters can be adjusted in a targeted manner, thereby reducing the workload. When monitoring okay processes, a large part of the destructive tests can be dispensed with. Systems can be deliberately serviced before a defect in order to minimize downtimes.

The invention claimed is:

1. A method for determining a quality status of at least one component which is used during a setting process, comprising
   providing a battery module;
   providing a battery housing having a housing base and a receptacle region assigned to the battery module arranging a heat conducting compound in the receptacle region on the housing base; and
   placing the battery module in the receptacle region on the heat conducting compound and is pressed using a predefinable force (F) in a first direction (z), which points in the direction (z) of the housing base, so that the heat conducting compound located between the battery module and the housing base is at least partially distributed in a second direction perpendicular to the first direction (z),
   wherein the predefinable force (F) and the distance (z) covered by the battery module during the setting process in the first direction (z) over time (t) during the setting process are acquired as monitoring variables and the quality status is determined as a function of at least one characteristic of at least one of the monitoring variables and a signal is provided as a function of the determined quality status; and
   wherein the at least one characteristic is acquired as a characteristic
   of a curve of the force (F) over time (t), in particular a slope of the curve; and or
   of a curve of the distance (z) over time (t).

2. The method as claimed in claim 1, wherein the component represents an arrangement comprising the battery module, the battery housing, and the heat conducting compound, wherein the quality status is determined as a function of a characteristic of a maximum gap height (H) of a gap between the battery module and the housing base that is at least partially filled using heat conducting compound, and/or is determined as a function of a degree of wetting (B) of the wetting of a lower side of the battery module facing toward the housing base with the heat conducting compound.

3. The method as claimed in claim 2, wherein the component represents at least one part of the setting device, and the quality status represents a state of wear of the at least one part of the setting device.

4. The method as claimed in claim 2, wherein the at least one characteristic is acquired as a characteristic
   of a curve of the force (F) over time (t), in particular a slope of the curve; and or
   of a curve of the distance (z) over time (t); and/or
   of a curve of the force (F) as a function of the distance (z); and or
   of a curve of the distance (z) as a function of the force (F), in particular in the form of a path length ($\Delta z$) from a predetermined force threshold value of the force (F).

5. The method as claimed in claim 2, wherein, frequencies (f) of the curve of the force (F) and/or a characteristic of work (W) performed by the force (F) over time (t) are determined as the at least one characteristic.

6. The method as claimed in claim 2, wherein at least one status parameter different from the monitoring variables is acquired, and the quality status is determined as a function of the status parameter.

7. The method as claimed in claim 1, wherein the component represents at least one part of the setting device, and the quality status represents a state of wear of the at least one part of the setting device.

8. The method as claimed in claim 7, wherein the at least one characteristic is acquired as a characteristic
   of a curve of the force (F) over time (t), in particular a slope of the curve; and or
   of a curve of the distance (z) over time (t); and/or
   of a curve of the force (F) as a function of the distance (z); and or
   of a curve of the distance (z) as a function of the force (F), in particular in the form of a path length ($\Delta z$) from a predetermined force threshold value of the force (F).

9. The method as claimed in claim 7, wherein, frequencies (f) of the curve of the force (F) and/or a characteristic of work (W) performed by the force (F) over time (t) are determined as the at least one characteristic.

10. The method as claimed in claim 7, wherein at least one status parameter different from the monitoring variables is acquired, and the quality status is determined as a function of the status parameter.

11. The method as claimed in claim 1, wherein the at least one characteristic is acquired as a characteristic
    of a curve of the force (F) over time (t), in particular a slope of the curve; and or
    of a curve of the distance (z) over time (t); and/or
    of a curve of the force (F) as a function of the distance (z); and or
    of a curve of the distance (z) as a function of the force (F), in particular in the form of a path length ($\Delta z$) from a predetermined force threshold value of the force (F).

12. The method as claimed in claim 11, wherein, frequencies (f) of the curve of the force (F) and/or a characteristic of work (W) performed by the force (F) over time (t) are determined as the at least one characteristic.

13. The method as claimed in claim 11, wherein at least one status parameter different from the monitoring variables is acquired, and the quality status is determined as a function of the status parameter.

14. The method as claimed in claim 1, wherein, frequencies (f) of the curve of the force (F) and/or a characteristic of work (W) performed by the force (F) over time (t) are determined as the at least one characteristic.

15. The method as claimed in claim 14, wherein at least one status parameter different from the monitoring variables is acquired, and the quality status is determined as a function of the status parameter.

16. The method as claimed in claim 1, wherein at least one status parameter different from the monitoring variables is acquired, and the quality status is determined as a function of the status parameter.

17. The method as claimed in claim 1, wherein the status parameter represents a temperature (T) in the surroundings of the heat conducting compound and/or the status parameter represents a period of time ($\Delta t$) between the application of the heat conducting compound to the housing base and the placement of the battery module.

18. The method as claimed in claim 1, wherein the determined quality status indicates whether the component is okay or not okay.

19. The method as claimed in claim 1, wherein the quality status is determined by an artificial intelligence, in particular by an artificial neural network.

20. An apparatus comprising: a control device for monitoring a setting process and for determining a quality status of at least one component which is used during the setting process, in which a battery module is provided;

a battery housing having a housing base and a receptacle region assigned to the battery module is provided, wherein a heat conducting compound is arranged in the receptacle region on the housing base;

the battery module is placed in the receptacle region on the heat conducting compound and is pressed using a predefinable force (F) in a first direction (z), which points in the direction (z) of the housing base, so that the heat conducting compound located between the battery module and the housing base is at least partially distributed in a second direction perpendicular to the first direction (z), wherein the control device is configured, for monitoring the setting process, to acquire the predefinable force (F) and the distance (z) covered by the battery module during the setting process in the first direction (z) over time during the period of the setting process as monitoring variables and to determine the quality status as a function of at least one characteristic of at least one of the monitoring variables and to provide a signal as a function of the determined quality status; and wherein the at least one characteristic is acquired as a characteristic of a curve of the force (F) over time (t), in particular a slope of the curve; and or of a curve of the distance (z) over time (t).

* * * * *